United States Patent
Speransky et al.

[15] 3,665,232
[45] May 23, 1972

[54] ELECTROHYDRAULIC CALIPER DISC BRAKE

[72] Inventors: Jaroslav Speransky; Harry E. Cerny, both of Duluth, Minn.

[73] Assignee: Microdot, Inc., Greenwich, Conn.

[22] Filed: Nov. 12, 1970

[21] Appl. No.: 88,635

[52] U.S. Cl. .......................................... 310/77, 188/171
[51] Int. Cl. .................................................. H02k 7/102
[58] Field of Search ................ 188/171, 173, 163; 310/77, 310/76

[56] References Cited

UNITED STATES PATENTS

| | | |
|---|---|---|
| 3,525,424 | 8/1970 | McCarthy ........................... 188/171 |
| 3,337,010 | 8/1967 | Wrensch ............................. 188/171 |
| 3,556,266 | 1/1971 | McCarthy ........................... 188/171 |

Primary Examiner—D. F. Duggan
Attorney—Harness, Dickey & Pierce

[57] ABSTRACT

A unit attached to the frame of a motor for insuring quick braking when the current is shut off. The unit comprises a housing enclosing a solenoid and supporting a pair of mechanical calipers on opposite sides of a disc secured to the motor shaft. A pair of opposed links connect the solenoid plunger to the calipers, and a spring urges the plunger toward a position setting the brake. When current is supplied to the motor it will energize the solenoid to release the brake. A hydraulically operated caliper brake is also mounted in the housing for alternate use.

9 Claims, 3 Drawing Figures

INVENTORS
Jaroslav Speransky
BY Harry E. Cerny
Harness, Dickey & Pierce
ATTORNEYS

ELECTROHYDRAULIC CALIPER DISC BRAKE

BACKGROUND OF THE INVENTION

1. Field of the Invention

The invention relates to brake assemblies for electrical motors where it is desired that the motor be braked immediately when current is cut off. An example would be a crane motor installation, where the load must be stopped in an accurate manner.

2. Description of the Prior Art

Known brakes of this type include both disc and shoe brakes which are operated either electromechanically or hydraulically. There is a need however for a combined electromechanical and hydraulic brake mounted on a common base which is relatively inexpensive and is suitable for attaching to standard electrical motors in all positions. Presently existing brakes have limited mounting possibilities and are expensive to manufacture and maintain.

BRIEF SUMMARY OF THE INVENTION

According to the invention, a housing is provided which is attached to the motor frame and surrounds a disc secured to the shaft. The housing has a pair of electromechanical caliper type brakes on opposite sides of the disc, and a solenoid with a plunger connected to the calipers. The means of connecting the plunger to the calipers comprises a pair of oppositely extending links, and a spring normally holds the plunger in a position setting the brake. The solenoid is energized simultaneously with energization of the motor, shifting the calipers to their brake-released position. When motor current is cut off, the spring will rapidly apply the brakes. The oppositely disposed links serve to support the plunger, thus reducing the cost of manufacture.

A hydraulic brake is also mounted in the housing, this brake also being of the caliper type and acting on the same disc. The hydraulic caliper is mounted independently and may be operated either alternately or in conjunction with the electromechanical brakes.

DESCRIPTION OF THE PREFERRED EMBODIMENT

Figure 1:
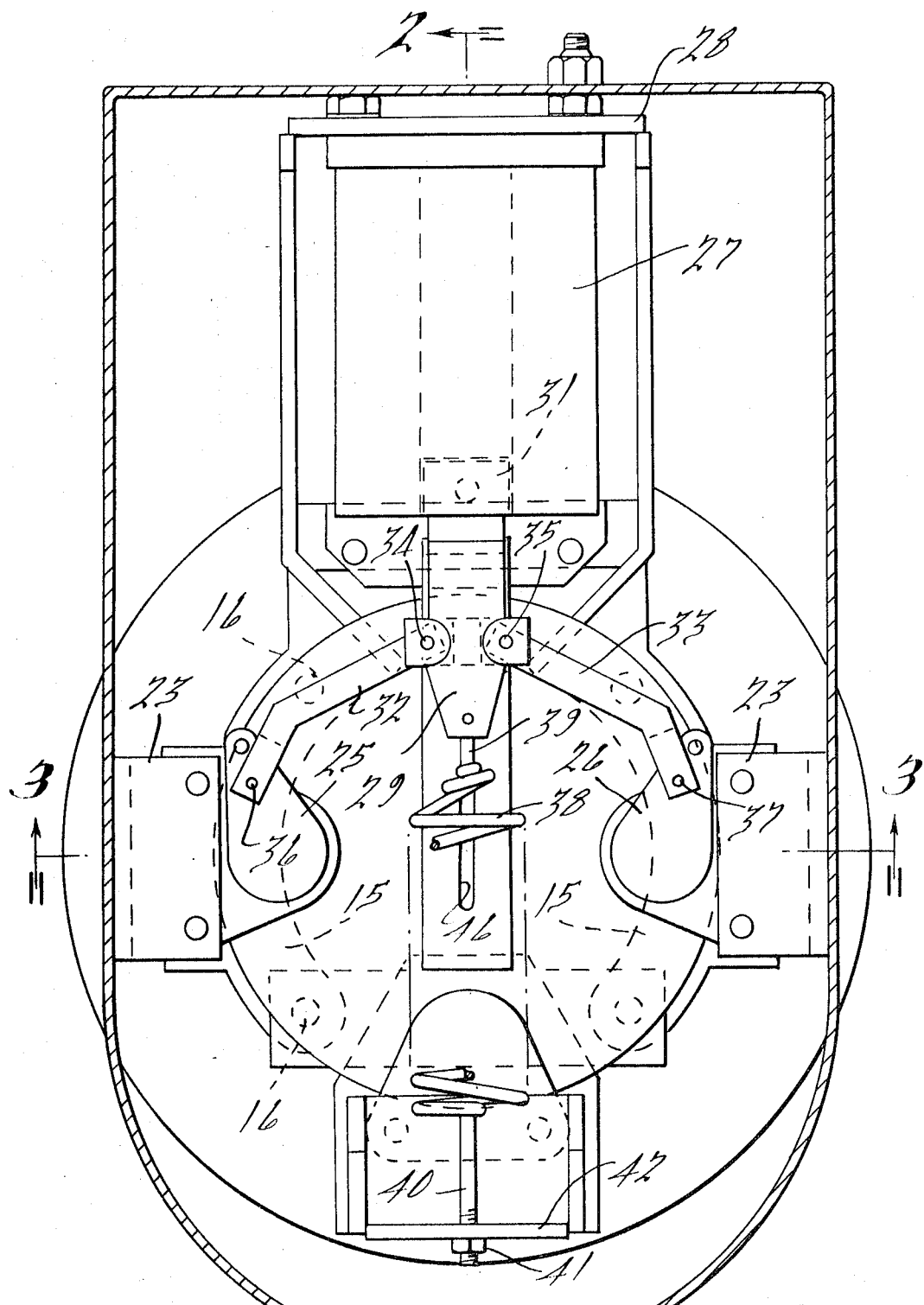
FIG. 1 is a cross-sectional end view in elevation of the invention shown as applied to a motor.

The unit is generally indicated at 11 and is intended for use in conjunction with an electric motor 12 used to drive a mechanism (not shown) such as a crane. Unit 11 comprises a frame 13 carrying a housing 14 and secured to one end of motor 12 by means of arms 15 and bolts 16. Motor shaft 17 projects into housing 14 and carries a brake disc 18 which is held thereon by an adjustable collar 19.

Figure 3:
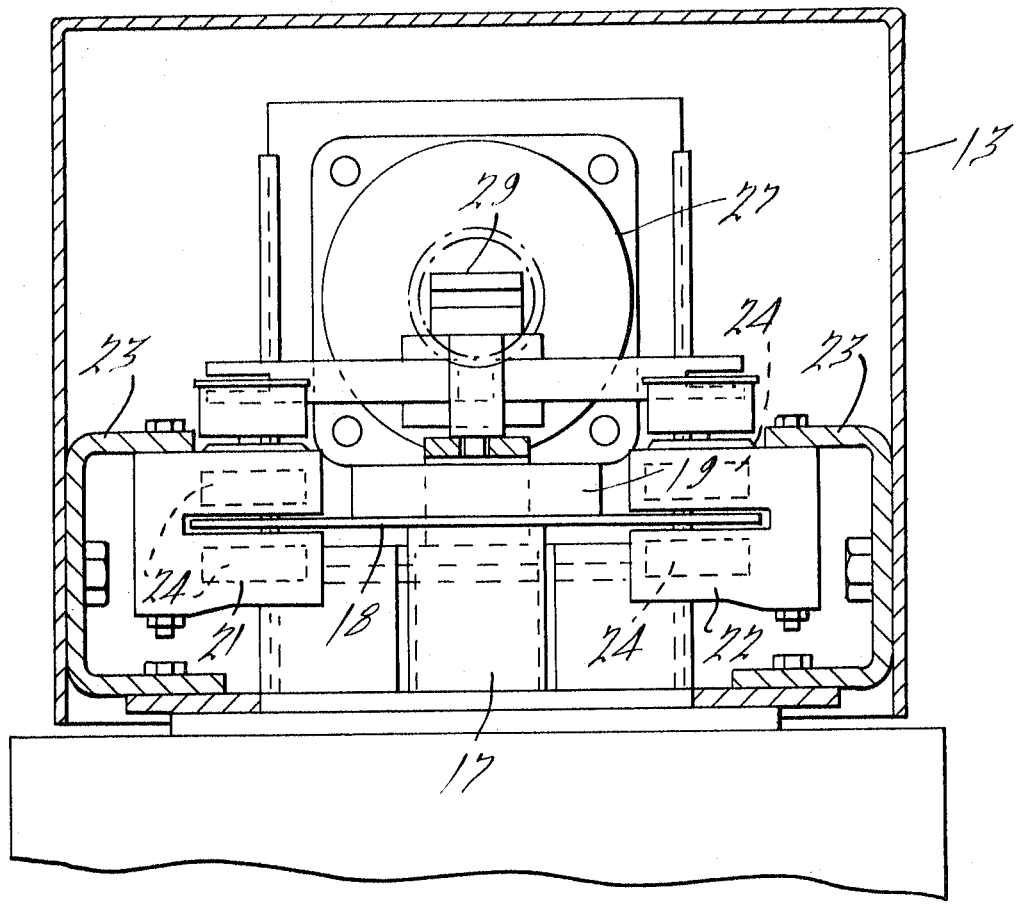
FIG. 3 is a plan cross-sectional view taken along the line 3—3 of FIG. 1.

A pair of disc brake calipers 21 and 22 (FIG. 3) are mounted on opposite sides of disc 18, being held in position by brackets 23 attached to frame 13. Calipers 21 and 22 are of a conventional type, having friction pads 24 which contact opposite sides of the disc. In the case of calipers 21 and 22, these pads are actuated by the rocking of arms 25 and 26 respectively in opposite directions. Counterclockwise rotation of arm 25 and clockwise rotation of arm 26, from their FIG. 1 position, will cause pads 24 to engage disc 18, stopping motor 12. FIG. 1 shows arms 25 and 26 in their brake releasing position.

The arms are actuated by a solenoid 27 secured to an extension 28 on frame 13, and a yoke 29 extends downwardly from the solenoid plunger 31. A pair of links 32 and 33 connect yoke 29 with arms 25 and 26 respectively. These links extend in opposite directions from the yoke, as seen in FIG. 1, and are pivotally connected at 34 and 35 to opposite sides thereof, so that the forces transmitted between the links and yoke will have equal and opposite effects about the yoke axis. The pivots 36 and 37 between links 32 and 33 respectively and arms 25 and 26 are spaced from the pivots of the arms, so that upward movement of plunger 31 to its FIG. 1 position when solenoid 27 is energized will swing arm 25 clockwise and arm 26 counterclockwise. This will release the disc brake as discussed above. The current supplied to solenoid 27 is controlled by means (not shown) in parallel with the power supplied to motor 12, so that solenoid 27 will be energized when the motor is turning but will be deenergized when the motor is shut off.

The means for applying brake pads 24 in calipers 21 and 22 comprises a helical coil tension spring 38. The upper end 39 of this spring is secured to the lower end of yoke 29 and the lower end 40 is attached by a tension adjusting nut 41 to a bracket 42. This bracket, which is carried by frame 13, also forms a support for a brake caliper 43 at the lower end of disc 18. Caliper 43 has brake pads 24 engageable with disc 18 in response to the application of hydraulic pressure from a line indicated partially at 44. In a crane installation, for example, electrically operated brake calipers 21 and 22 would be used for parking, with the operator using the supplementary hydraulic brake caliper 43 while in operation or where either cab or floor operation is required.

Figure 2:
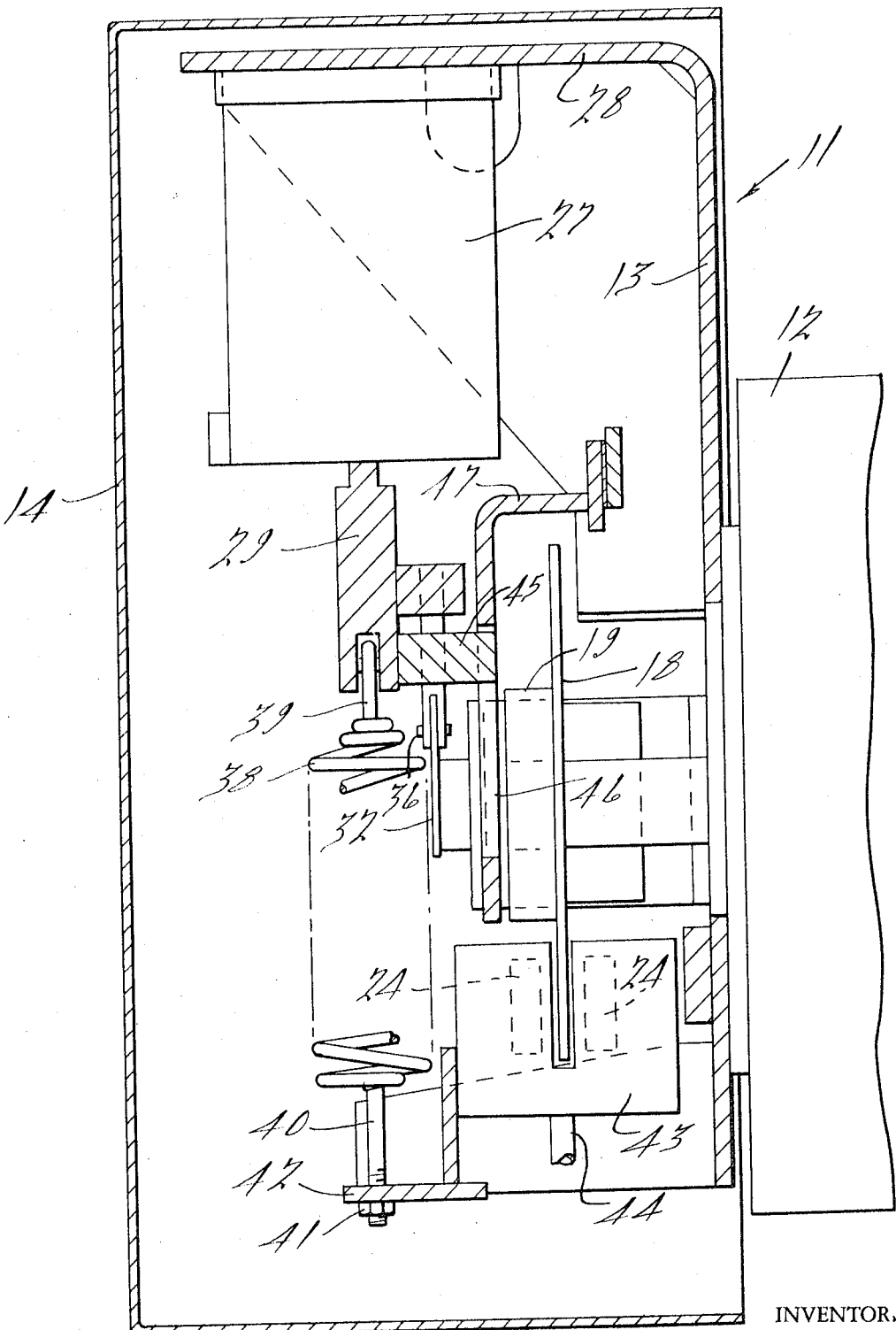
FIG. 2 is a cross-sectional side view in elevation taken along the line 2—2 of FIG. 1.

Because of the directly opposed forces acting between linkages 32 and 33 and yoke 29, as previously described, the yoke and plunger need not be provided with guide or supporting means in a lateral direction, as seen in FIG. 1. A support 45 is secured to yoke as seen in FIG. 2 and is guided by a slot 46 in a guide 47 secured to frame 13. Guide 45 will only be subjected to incidental forces as yoke 29 is raised and lowered.

In operation, as long as motor 12 is deenergized, solenoid 27 will likewise be inactivated, so that spring 38 will hold yoke 29 in its lower position, with arm 25 swung counterclockwise and arm 26 swung clockwise from their FIG. 1 positions. Pads 24 in brake calipers 21 and 22 will thus be in contact with disc 18 and the brake will be applied.

Upon energization of motor 12, solenoid 27 will likewise be energized, lifting yoke 29 to the positions shown in FIGS. 1 and 2. This will cause links 32 and 33 to swing arms 25 and 26 toward their brake releasing positions as shown in these figures, against the action of spring 38. During this movement the opposing forces of links 32 and 33 acting on yoke 29 and its associated plunger 31 will maintain the yoke and plunger in a stable position, without the need for any lateral guide means.

The parts will remain in their brake releasing position until the current to motor 12 is cut off. At that point solenoid 27 will be deenergized and spring 38 will cause yoke 29 to descend rapidly. Links 32 and 33 will swing arms 25 and 26 respectively toward their brake applying positions.

Because of the novel linkage arrangement between the solenoid plunger and brake actuating arms, it is possible to operate the brakes merely by the use of a central spring force coaxial with the plunger. Thus, adjustment of the braking force is made much simpler, since varying the spring tension by means of adjusting nut 41 threaded onto lower spring end 40 will suffice for brake pressure control. Adjustment of the operative length of spring 38 will thus in effect control the braking forces in both brake calipers 21 and 22.

What is claimed is:

1. In combination with an electric motor having a frame and a shaft extending from one end thereof, braking means comprising a disc secured to said shaft, a brake mechanism frame secured to the motor at said shaft end, pad supporting means carried by said brake mechanism frame adjacent said disc and having braking pads movable into and out of braking engagement with the disc, said pad supporting means comprising brake calipers surrounding said disc, selectively operable means carried by said brake mechanism frame and connected to said pad supporting means, said selectively operable means comprising a solenoid having a plunger and energizable to release said brake, a spring urging said brake to a braking position, linkage means connecting said solenoid plunger and spring with said calipers, and a cover mounted on said frame and enclosing said disc, pad supporting means and selectively operable means.

2. The combination according to claim 1, there being two brake calipers located at opposite sides of said disc, said linkage means comprising two links extending in opposite directions from said plunger, whereby the lateral forces between said plunger and links will be counterbalanced.

3. The combination according to claim 5, said spring being further provided with means for adjusting its tension, whereby the braking force may be varied.

4. In combination with a motor having a shaft extending from one end thereof, a disc mounted on said shaft end, a frame having one portion secured to the end of said motor and another portion extending outwardly therefrom, a solenoid plunger mounted on said outwardly extending frame portion and extending at right angles to said shaft, a pair of calipers carried by said frame on opposite sides of said disc, each caliper carrying two opposing pads movable into and out of engagement with opposite surfaces of said disc, a pair of links extending from opposite sides of said solenoid plunger and connected to said brake calipers, each link being pivoted to said plunger and to one of said calipers, whereby energization of said solenoid will release said brakes, and a spring urging said brake calipers toward their brake applying position.

5. The combination according to claim 4, said spring comprising a helical coil tension spring secured at one end to said frame and at the other end to said plunger and being coaxial with said plunger, whereby no lateral forces will be imposed on said plunger during application or release of said brakes.

6. The combination according to claim 5, further provided with a pair of arms rotatably mounted on said brake calipers, said links being pivotally connected at their inner ends to said plunger and at their outer ends to said arms.

7. The combination according to claim 2, said plunger being connected to said links by means of a yoke extending from the plunger, said spring being connected to said yoke.

8. The combination according to claim 3, said plunger being connected to said links by means of a yoke extending from the plunger, said spring being connected to said yoke.

9. The combination according to claim 3, further provided with a third brake caliper between said first two calipers, and hydraulic means for operating said third brake caliper independently of the first two calipers.

* * * * *